(12) United States Patent
Hechler et al.

(10) Patent No.: US 6,398,862 B1
(45) Date of Patent: Jun. 4, 2002

(54) PIGMENT PREPARATION

(75) Inventors: Wolfgang Hechler, Reichenbach; Gerhard Herget, Ober-Ramstadt; Brigitte Husseini, Darmstadt, all of (DE)

(73) Assignee: Merck Patent Gesellschaft mit Beschraenkter Haftung, Darmstadt (DE)

( * ) Notice: Subject to any disclaimer, the term of this patent is extended or adjusted under 35 U.S.C. 154(b) by 0 days.

(21) Appl. No.: 09/380,304

(22) PCT Filed: Feb. 14, 1998

(86) PCT No.: PCT/EP98/00850

§ 371 (c)(1),
(2), (4) Date: Aug. 30, 1999

(87) PCT Pub. No.: WO98/38253

PCT Pub. Date: Sep. 3, 1998

(30) Foreign Application Priority Data

Feb. 28, 1997 (DE) .......................................... 197 08 167

(51) Int. Cl.⁷ .............................. C09C 1/00; C09C 3/04; C09D 17/00; C09D 7/12; C08K 9/08

(52) U.S. Cl. ........................ 106/404; 106/401; 106/403; 106/415; 106/417; 106/418

(58) Field of Search ................................. 106/401, 403, 106/404, 415, 417, 418

(56) References Cited

U.S. PATENT DOCUMENTS

| 5,104,822 A | 4/1992 | Chang ......................... 524/441 |
| 5,618,342 A | 4/1997 | Herget et al. ................ 106/416 |

FOREIGN PATENT DOCUMENTS

| EP | 240367 | 10/1987 |
| EP | 256418 | 2/1988 |
| EP | 803552 | 10/1997 |
| FR | 2354300 | 1/1978 |

*Primary Examiner*—C. Melissa Koslow
(74) *Attorney, Agent, or Firm*—Millen, White, Zelano & Branigan, P.C.

(57) ABSTRACT

The invention relates to a non-dusting homogeneous pigment preparation notable in that it comprises at least 40% by weight of one or more pearl lustre pigments.

13 Claims, No Drawings

PIGMENT PREPARATION

The invention relates to a non-dusting homogeneous pigment preparation notable in that it contains at least 40% by weight of one or more effect pigments.

Pigments in industrial processes are often employed not in the form of dry powders, since such powders form dust, which leads to increased requirements in terms of workplace safety. In addition, the incorporation of powders into plastics, basecoat systems, etc., is frequently observed to be accompanied by agglomeration of the pigment powder. Homogeneous distribution of the pigment in the respective matrix is in many cases difficult if not impossible to achieve.

Instead of the pigment powder, non-dusting pigment preparations are used. These are free-flowing powders, pearl lustre pigments being coated with polymers, as are described, for example, in DE-C-2603211, pigmented free-flowing powders with a low moisture content, as disclosed, for example, by DE-A-4139993, or pigmented powders having a higher moisture content, the latter frequently being referred to as pastes owing to their fluid consistency.

Pastes are an industrial alternative to the dry or moistened powders provided they meet the following general conditions:

flowable consistency minimal dilatancy maximum pigment content

The components of the preparation/paste should be chosen such that the preparation is tailored to suit the other components of the respective coating system and, once incorporated, lends itself well to homogeneous distribution.

In addition to good compatibility with the other components of the coating system, pigment preparations are required to exhibit high stability; that is, they must not tend towards phase separation. This requirement is particularly important in the case of pigment preparations based on platelet-shaped pigments, since owing to their structure such pigments have a tendency to undergo caking on phase separation and are difficult to reagitate. For example, an aqueous pigment preparation obtained by forming an aqueous paste of a pearl lustre pigment powder frequently exhibits inadequate stability.

Aqueous pigment preparations, which have long been required for cosmetics, for example, are increasingly becoming of significance for other applications as well, such as for the production of waterborne coating materials, etc., on environmental grounds.

The preparations with pearl lustre pigments and metallic pigments that have been developed to date for use in coating systems, especially aqueous systems, with a pigment content >30% by weight frequently do not go far enough towards meeting the requirements described, especially insofar as they have a tendency towards shear thickening.

The object of the present invention was therefore to provide pigment preparations, especially in paste form, comprising at least 40% by weight of effect pigments, which can also be used to very good effect in aqueous coating systems, possess high stability, and at the same time feature a high level of compatibility with the other components of the coating system. Furthermore, the pigment preparation of the invention ought also to be suitable for producing dry preparations in the form, for example, of granules.

It has been found that this object. can be achieved by the provision of the pigment preparation of the invention. The invention therefore provides a non-dusting homogeneous pigment preparation which comprises 40–60% by weight of one or more effect pigments, 0.1–5% by weight of surface-active substances, 0.5–40% by weight of organic polymers, 1–40% by weight of an organic solvent or solvent mixture, 0–50% by weight of water and, if desired, 0–10% by weight of a pH regulator.

Depending on its moisture content, the preparation of the invention is a flowable paste which is highly suitable for producing dry preparations, e.g. granules, pellets, briquettes. The dry preparations produced from the pigment preparation of the invention are likewise provided by the invention.

Pearl lustre pigments used are pigments based on platelet-shaped, transparent or semitransparent substrates comprising, for example, sheet silicates, such as mica, synthetic mica, talc, sericite, kaolin, or comprising glass or other silicatic materials, which are coated with coloured or colourless metal oxides such as, for example, $TiO_2$, $Fe_2O_3$, $Fe_3O_4$, $SnO_2$, $Cr_2O_3$, ZnO, CuO, NiO and other metal oxides, alone or in a mixture, in one uniform layer or in successive layers. These pigments are, for example, from the German patents and patent applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and P 38 42 330 and are obtainable commercially, for example under the brand name Iriodin® from Merck KGaA, Darmstadt, BRD. Particularly preferred pigment preparations comprise $TiO_2$/mica, $Fe_2O_3$/mica and/or $TiO_2/Fe_2O_3$ mica pigments.

Suitable metallic pigments are all of the plateletshaped substrates known to the skilled worker, examples being aluminium plates or metal oxide-coated aluminium plates, as marketed, for example, by Eckart-Werke, Fürth.

The pigment preparations of the invention can comprise one or more effect pigments. In many cases, it is possible by using at least two different pearl lustre pigments to obtain special colour effects and lustre effects. The pigment preparation may also be a mix of pearl lustre pigment and metallic pigment. In that case the ratio is preferably from 10:1, especially 1:1. Preferred pigment preparations comprise one or more pearl lustre pigments.

The pigment preparation of the invention comprises preferably 40–60% by weight of effect pigments, in particular 45–60% by weight. Very particular preference is given to pigment preparations containing more than 50% by weight of effect pigments.

Suitable surface-active substances are, in particular, those which contain a hydrophobic molecular side chain, such as alkylsilanes, for example, which may also include a further functional group, unsaturated or saturated fatty acids, or fluorosurfactants. Particular preference is given to the use as surface-active substances of silane compounds of the formula $(C_nH_{2n+1})Si(OC_mH_{2m+1})_3$, in which n is 1–30 and m is 1–10. Examples of suitable silane compounds are nhexyl-decyltriethoxysilane and n-octyldecyltriethoxysilane (Si 116 and Si 118, respectively, from Degussa AG, Frankfurt, FRG) and the corresponding fluoroalkylsilanes.

Further surface-active substances employed are the saturated and unsaturated fatty acids, such as caproic acid, caprylic acid, capric acid, lauric acid, myristic acid, palmitic acid, stearic acid, oleic acid, linoleic acid, and fatty acid mixtures.

Appropriate fluoro surfactants consist of a relatively long perfluorinated or partially fluorinated alkyl chain and a hydrophilic or organophilic head group, such as a polyoxyethylene, carboxyl or sulfone group, for example. They are cationic, nonionic or anionic in construction. Use is made in particular of fluoro surfactants which are marketed under the tradenames FLUORAD FC430 and FC431 (from 3M) and Borchigol FT448 (from Borchers, Dusseldorf, FRG).

The pigment preparation preferably comprises a silane, a surfactant or a fatty acid. The surface-active reagent can also comprise a mixture of silane, fatty acids and/or surfactants. The proportion of all compounds in the preparation should, however, not exceed 5% by weight, preferably 2% by weight.

The pigment preparations contain from 0.1 to 5% by weight, preferably from 0.2 to 3% by weight and, in particular, from 0.5 to 2% by weight of surface-active substances.

As a third-mandatory component, the pigment preparation of the invention contains from 0.5 to 40% by weight, preferably from 1 to 15% by weight and, in particular, from 2 to 10% by weight of an organic polymer or polymer mixture.

Suitable organic polymers are thickeners, dispersants and/or binder resins as commonly added to paints and coatings and as listed, for example, in Karsten, Lackrohstofftabellen, $8^{th}$ edition 1987. Suitable binders are all those binders or binder mixtures which are conventionally suitable for printing inks, provided they are the same as, or at least compatible with, the particular printing ink binder system employed. It is therefore possible to employ binders based on cellulose, on polyacrylate, polymethacrylate, alkyd, polyester, polyphenol, urea, melamine, polyterpene, polyvinyl, polyvinyl chloride and polyvinyl pyrrolidone resins, polystyrenes, polyolefins, on indene-coumarone, hydrocarbon, ketone, aldehyde, and aromatic-formaldehyde resins, on carbamic acid, sulfonamide and epoxy resins, and on polyurethanes and/or natural oils or derivatives of the said substances. The pearl luster pigment preparation of the invention has been found to exhibit particularly good redispersibility when cellulose or cellulose compounds are employed as binder. Cellulose or cellulose compounds are seen to lead to an intensive initial wetting of the pearl luster pigment particles and so produce a printing ink precursor which, in turn, is very rapidly dispersed in a compatible binder solution when the printing ink is prepared. This applies in particular to initial wetting with cellulose compounds, since these apparently support firstly the binding of the polymer to the particles of the pearl luster pigment and secondly the formation of the paste from which, by compacting, the preparation in particle form is produced.

The group of cellulose and cellulose compounds that are particularly suitable for the process of the invention includes cellulose nitrate, alkylcellulose, hydroxycellulose, hydroxyalkylcellulose and cellulose acetobutyrate. Further preferred organic polymers are polyacrylic acid derivatives.

Particularly suitable thickeners are those which reduce the dilatancy without at the same time having a strong thickening action on the pearl lustre preparation, such as, for example, acrylic-methacrylic acid polymers.

The binder is selected in accordance with the technological requirements for the coating to be produced. Thus it is possible to employ customary film-forming binders, such as polyurethane-acrylate resins, acrylate-melamine resins, alkyd resins, polyester resins, polyurethanes, acrylate resins or epoxy resins and mixtures thereof as binders. Also suitable are nitrocellulose, cellulose acetopropionate, cellulose acetobutyrate, ketone resins, aldehyde resins and polyvinyl butyral.

The solvent component in the pigment preparation of the invention must be matched skillfully to the respective binder. For producing the preparation it is possible to employ all organic solvents, preferably those which are emulsifiable or miscible with water. Examples of suitable solvents are aromatic solvents, such as toluenes, petroleum spirits, mineral oils, hydrocarbons, esters, vegetable oils, monohydric aliphatic alcohols, such as those having 2 to 4 carbon atoms, e.g. ethanol, butanol or isopropanol, or ketones, e.g. acetone or methyl ethyl iketone, or glycol ethers, such as propylene glycol monoethyl ether or propylene glycol monoethyl ether, or diols, such as ethylene glycol and propylene glycol or polyetherdiols, such as polyethylene glycol and polypropylene glycol, or polyols, such as aliphatic triols and tetrols of 2 to 6 carbon atoms, such as trimethylolethane, trimethylolpropane, glycerol, 1,2,4-butanetriol, 1,2,6-hexanetriol and pentaerythritol, and also all other solvents from other classes of compound, and/or mixtures of the above mentioned solvents. It is preferred to employ those solvents listed in Karsten, Lackrohstofftabellen, $8^{th}$ edition 1987. In particular, solvents used are those which are of infinite miscibility with water.

The pigment preparation of the invention contains from 1 to 40% by weight of an organic solvent or solvent mixture, preferably from 5 to 35% by weight and, in particular, from 10 to 30% by weight.

As a further component the pigment preparation preferably contains from 0 to 50% by weight of water, preferably from 5 to 40% by weight and, in particular, from 10 to 30% by weight.

The addition of neutralizing agents is necessary depending on the nature of the organic polymer added, although independently of this it has also in many cases proved advantageous when producing the pigment preparation to add to it a pH regulator. Particularly suitable such regulators are the bases customary in the coating sector, such as, for example, urea, urea derivatives, ammonia, amino alcohols, alkali metal hydroxides, such as KOH or NaOH, for example, and amines, preferably volatile organic amines of low molecular mass. The pH can also be adjusted to the desired level by adding mineral acids, such as $H_2SO_4$, HCl and $HNO_3$, for example, or organic carboxylic acids, such as acetic acid, for example.

The base or acid is added in an amount such that the pH of the preparation is from about 7.5 to 10, preferably from 7.5 to 9.

In general, the pigment preparation of the invention contains from 0 to 10% by weight of a pH regulator, preferably from 1 to 7% by weight and, in particular, from 1.5 to 3% by weight.

During or after its production, the pigment preparation of the invention can have further conventional additives added to it, examples being antifoams, wetting agents, anti-settling agents, levelling agents, siccatives and thixotropic agents. These additives are auxiliaries which are customary in the coatings industry and which may be present in the pigment preparation of the invention in an amount of from 0 to 10% by weight.

The pigment preparation of the invention is simply produced by adding the solvent, the surface-active substances and the organic polymer or polymer mixture simultaneously or in succession to the effect pigment or effect pigment mix and subjecting this mixture to gentle homogenization in a mixing device, especially an automated dispersing apparatus.

Preferably, the pigment is introduced initially and is first pasted up with the solvent comprising the surface-active substance, with stirring; subsequently, a further solution consisting of solvent and organic polymer is added. If desired, a first drying stage can be inserted as early as at this point, in which case the drying temperature can be between 80° and 150°. If required, further auxiliaries of the type typical for coatings are added finally.

The resultant pigment preparation of the invention is in the form of readily flowable pastes having a relatively high content of pearl lustre pigments. Because of the low weight fraction of organic components, the pigment preparation of the invention is highly compatible with commercially customary systems, both water-based and solvent-based, and is outstandingly suitable both for hydrophilic and hydrophobic media. Further features of the preparation are its freedom from dust, ready dispersibility and redispersibility, high storage stability and good processing properties, and it is therefore markedly superior to conventional pigment preparations.

The flowable pigment preparation is highly suitable for filling tubes and for extrusion. To produce dry preparations, the pigment preparation of the invention is extruded or compacted in granular form by other methods known to the skilled worker, and is subsequently dried if desired. The drying process takes place generally at temperatures from 20° C. to 150° C., lasts for between 0.5 and 4 h, and can be carried out under reduced pressure if desired. Finally, the dry preparation is comminuted if desired. The resulting granules are likewise non-dusting. The storage and transportation of the dry preparations are hence less restrictive and therefore highly unproblematic. The dry preparations possess the added advantage that they carry little or no liquid and can therefore be incorporated more readily into formulations.

The preparation of the invention, as a paste or as a dry preparation, can be used for diverse applications. It is preferably employed in coating systems from the print, paint and varnish sectors. With particular preference, the preparation is applied to any desired substrate materials, examples being metals such as iron, steel, aluminium, copper, bronze and brass and also metal foils, and also metal-clad surfaces of glass, ceramic and concrete, and to wood, e.g. furniture, clay, textile, paper, packaging materials, e.g. plastic containers, films or cardboard, or to other materials for decorative and/or protective purposes. A further important area of application, in addition, is that of waterborne coating materials.

The invention therefore additionally provides for the use of the pigment preparation in formulations such as paints, varnishes, printing inks and plastics.

The examples which follow are given to illustrate the invention without, however, limiting it.

EXAMPLES

Example 1

490 g of Iriodin 103 rutile sterling silver (TiO$_2$ mica pigment with a particle size of 10 to 50 $\mu$m from Merck KGBA, Darmstadt, FRG) are suspended in 30 ml of DI water (adjusted with acetic acid to a pH of 4) and the suspension is homogenized twice at 2000 rpm for 15 minutes each time on an automated dispersing apparatus (Dispermat). Following the addition of 30 g of ethanol and 10 g of Si 118 (from Degussa, FRG), the suspension is homogenized five times at 2000 rpm for 4 minutes each time. The pigment is discharged and dried at 140° C. for 3.5 h.

The product is passed through a 50 $\mu$m sieve and then introduced homogeneously into 600 g of a solution consisting of 96.7 g of Rohagit SD 15 (a polyacrylate from Röhm, Darmstadt, FRG), 203 g of DI water and 300 g of ethanol, and 1.25 g of ammoniac (about 25% by weight) are added with stirring. This gives a readily flowable paste which can easily be pressed from a tube. The pigment content is 44.5% by weight.

Example 2

323 g of Iriodin 103 rutile sterling silver (TiO$_2$ mica pigment with a particle size of 10 to 50 $\mu$m from Merck KGA, Darmstadt, FRG) are admixed with 20 g of DI water (adjusted with acetic acid to a pH of 4) and the suspension is homogenized twice at 2000 rpm for 15 minutes each time on an automated dispersing apparatus (Dispermat). Following the addition of 20 g of ethanol and 7 g of Si 118 (from Degussa, FRG), the suspension is homogenized five times at 2000 rpm for 4 minutes each time. The pigment is discharged and dried at 140° C. for 3.5 h. The product is passed through a 50 $\mu$m sieve and then introduced homogeneously into 330 g of a solution consisting of 5 g of Moviol CMB05500 (polyethylene glycol from Hoechst AG, FRG), 163 g of DI ater and 167 g of ethanol. This gives a readily flowable paste which can easily be pressed from a tube. The pigment content is 48.6% by weight.

Example 3

666 g of Iriodin 123 hellglanzsatin (TiO$_2$ mica pigment with a particle size of 5 to 20 $\mu$m from Merck KGaA, Darmstadt, FRG) are admixed with 42 g of DI water (adjusted with acetic acid to a pH of 4) and the suspension is homogenized twice at 2000 rpm for 15 minutes each time on an automated dispersing apparatus (Dispermat). Following the addition of 42 g of ethanol and 14 g of Si 118 (from Degussa, FRG), the suspension is homogenized five times at 2000 rpm for 4 minutes each time. The pigment is discharged and dried at 140° C. for 3.5 h. The product is passed through a 50 $\mu$m sieve and then introduced homogeneously into 600 g of a solution consisting of 104 g of Rohagit SD 15 (polyacrylate from Röhm, Darmstadt, FRG), 196 g of DI water and 300 g of ethanol, and 1.8 g of ammoniac (c=25%) are added with stirring. This gives a readily flowable paste which can easily be pressed from a tube. The pigment content is 52% by weight.

Example 4

594 g of Iriodin 103 rutile sterling silver (TiO$_2$ mica pigment with a particle size of 10 to 50 $\mu$m from Merck KGaA, Darmstadt, FRG) are admixed with 50 g of DI water and 12 g of FC 129 (from 3M) and the suspension is homogenized four times at 800 rpm for 5 minutes each time on an automated dispersing apparatus (Dispermat). The pigment is discharged and dried at 80° C. for 5 h. The product is passed through a 50 $\mu$m sieve and then introduced homogeneously into 600 g of a solution consisting of 96.7 g of Rohagit SD 15 (from Röhm, Darmstadt, FRG), 203 g of DI water and 300 g of ethanol, and 1.25 g of ammoniac (c=25%) are added with stirring. This gives a readily flowable paste which can easily be pressed. from a tube. The pigment content is 49.5% by weight.

What is claimed is:

1. A non-dusting homogeneous pigment preparation, comprising
   40–60% by weight of at least one effect pigment,
   0.1–5% by weight of surface-active substances, including at least one alkylsilane, 0.5–40% by weight of organic polymers, 1–40% by weight of an organic solvent or solvent mixture, 0–50% by weight of water and, 0–10% by weight of a pH regulator.

2. A non-dusting homogeneous pigment preparation according to claim 1, wherein the effect pigment is a pearl luster pigment and/or a metal pigment.

3. A non-dusting homogeneous pigment preparation according to claim 2, wherein the metal pigment comprises aluminum flakes or metal oxide-coated aluminum flakes.

4. A non-dusting homogeneous pigment preparation according to claim 1, wherein the surface-active substance is an alkylsilane, a saturated or unsaturated fatty acid and/or a fluoro surfactant.

5. A non-dusting homogeneous pigment preparation according to claim 1, wherein ammonia or urea is employed as the pH regulator.

6. A non-dusting homogeneous pigment preparation according to claim 1, further comprising defoamers, wetting agents, anti-settling agents, leveling agents, siccatives and/or thioxotropic agents.

7. A non-dusting homogeneous pigment preparation according to claim 1, wherein the alkylsilane is $(C_nH_{2n+1})Si(OC_mH_{2m+1})_3$ wherein n is 1–30 and m is 1–10.

8. A non-dusting homogeneous pigment preparation according to claim 1, wherein the alkylsilane is n-hexyldecyltriethoxysilane or n-octyldecyltriethoxysilane.

9. A process for producing a dry pigment preparation, comprising as extruding a preparation according to claim 1, and optionally subsequently drying and finally comminuting.

10. A dry preparation produced from the non-dusting homogeneous pigment preparation according to claim 1 by extruding the pigment preparation, optionally subsequently drying, and finally comminuting.

11. A paint, varnish, printing ink or plastic comprising a preparation according to claim 1.

12. A non-dusting homogeneous pigment preparation comprising

40–60% by weight of at least one pearl luster pigment which is a $TiO_2$/mica and/or $Fe_2O_3$ mica pigment, 0.1–5% by weight of surface-active substances, 0.5–40% by weight of organic polymers, 1–40% by weight of an organic solvent or solvent mixture, 0–50% by weight of water and, 0–10% by weight of a pH regulator.

13. A non-dusting homogeneous pigment preparation, comprising

40–60% by weight of at least one effect pigment, 0.1–5% by weight of surface active substances;

0.5–40% by weight of organic polymers, wherein at least one organic polymer is a polyacrylic acid derivative, 1–40% by weight of an organic solvent or solvent mixture, 0–50% by weight of water and, 0–10% by weight of a pH regulator.

* * * * *